United States Patent Office 3,429,248
Patented Feb. 25, 1969

3,429,248
PRESSURE CONTROL SYSTEMS FOR CLOSED CHAMBERS
Owen D. A. C. Furlong, East Coker, near Yeovil, Somerset, England, assignor to Westland Aircraft Limited, Yeovil, Somerset, England
Filed Aug. 5, 1966, Ser. No. 570,530
Claims priority, application Great Britain, Sept. 22, 1965, 40,489/65
U.S. Cl. 98—1.5                    15 Claims
Int. Cl. B64d *13/04;* F15c *1/12*

ABSTRACT OF THE DISCLOSURE

A pressure control system wherein the pressure in a chamber for example an aircraft cabin, is maintained by fluid operated logic components which have no moving parts.

---

This invention relates to a pressure control system actuated by fluid operated logic components, the system being developed mainly, but not exclusively, for use in pressurised aircraft.

Pressure control systems, for example in aircraft, have, through the years, been developed to a stage where they are not only complicated in their arrangement, and space-consuming in their size, but, due to the necessary duplication of components as a safety measure against possible failure, these systems tend to add considerably to the overall weight of the aircraft.

Such systems, employing numerous moving parts, suffer limitations due to friction and wear, thermal expansion, and inertia or weight.

Accordingly, an object of the invention is to utilise a system of fluid amplifier elements and fluid logic devices having no moving parts, to control the pressurisation of an enclosed chamber automatically.

As is well understood, fluid amplifier or fluid logic elements are those that can be used in systems based on Boolean algebra, and cater for relationships expressed by "and," "or," "not," "either." One such element includes a power nozzle that supplies air continuously, to be received selectively by two apertures according to the action of lateral control jets or pressures, arranged to cause the jet from the power nozzle to deviate towards one or other of the apertures, or to remain centrally between them. It is to be understood, however, that in the present invention the logic elements are not necessarily used as they are in the rigorous system of symbolic logic.

According to the invention, I provide a fluid-operated pressurisation control system for enclosed chambers, including means within the chamber varying a fluid flow to a control nozzle of a fluid amplifier element in relation to the pressure in the enclosed chamber, whereby interaction of the fluid from the control nozzle with a fluid power flow from a lower nozzle of the fluid amplifier element directs the fluid power flow toward one or more outlet apertures, the fluid flow in the outlet apertures, amplified if required, actuating valve means to control the inflow or outflow of fluid from the enclosed chamber, in order to adjust the chamber towards a predetermined pressure.

In another embodiment of the invention, I provide a fluid operated pressurisation control system for enclosed chambers, including a fluid flow from a source of compressed fluid to the enclosed chamber, and a fluid flow from the enclosed chamber, said flow or flows being under the control of valve means actuated by the output from one or more fluid amplifiers of the type wherein a fluid power flow from a power nozzle is diverted towards one or more outlet apertures by interaction with control fluid from at least one fluid control nozzle, said control fluid being varied by a pressure sensor in relation to the pressure within the enclosed chamber.

Thus, there may be a capsule-operated valve responsive to the pressure in the chamber, controlling the flow to the control nozzle of a fluid amplifier element, and the output of this element may be amplified by one or more further fluid amplifier elements, to control a pressure responsive discharge valve for the chamber. The action is preferably stabilised by a lead lag feed-back to one of the amplifier elements. The rate of change of pressure in the chamber may be further controlled according to one or more additional factors, each registered in an amplifier element, and superimposed on the output of an amplifier element that is responsive to the chamber pressure. For example, in the case of an aircraft cabin, a pressure change due to a change in altitude may be sensed by a system involving a chamber having a fixed capacity, the rate of change of pressure in the chamber being responded to by an amplifier element.

Preferred embodiments of the invention will now be described, by way of example only, with reference to the accompanying drawings, in which.

Figure 1:
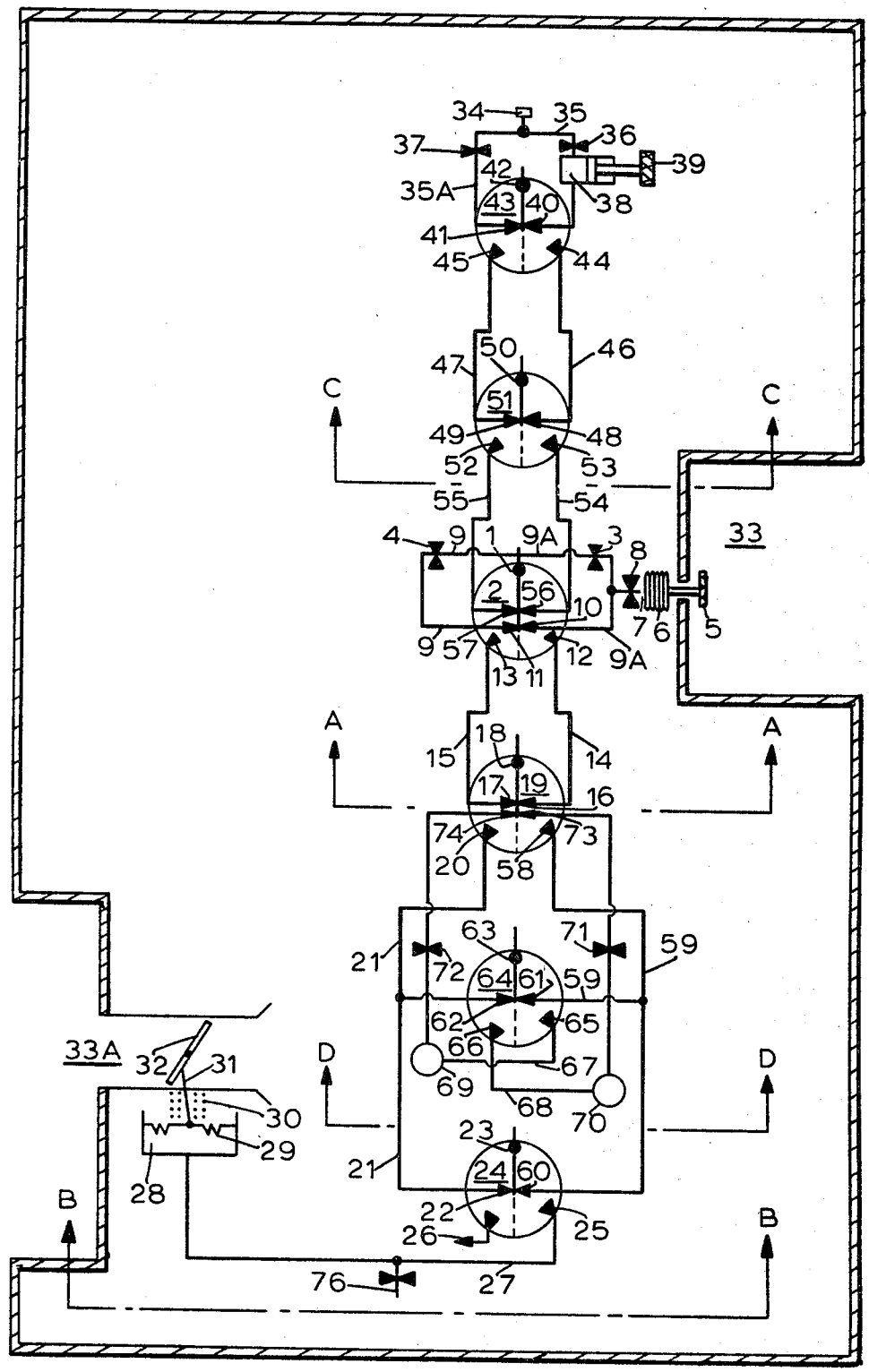
FIGURE 1 represents an embodiment of the system for use in a passenger aircraft, and shows a circuit diagram of a cabin pressurisation control system.

The circuit diagram of FIGURE 1 has been divided into four sections, A–D, in order to simplify the description. A—A represents the main control and Section B—B the power sections; Section C—C provides a controlled rate of change of pressure control acting directly into Section A—A, and Section D—D provides a stabilising unit operating by lead lag feed-back. The power supply nozzles for each amplifier element are fed at a predetermined pressure from a common manifold, supplied by a stabilised pressure source, such as the compressor and reducing valve system, described with reference to FIGURE 2, and standard in fluid logic systems.

In Section A—A a power nozzle 1 supplies air continuously into an amplifier element 2, preferably an analogue element of the jet interaction beam deflection type, although the pressure interaction or other types may be used. Control streams are diverted from the air flow supplying the power nozzle 1 into control channels 9 and 9A, and pass through restrictors 3 and 4, to feed control nozzles 10 and 11. Positioned to act in conjunction with control channel 9A is a cabin altitude selector comprising an absolute capsule 6 and pad valve 7, adjustably positioned by a screw 5, by means of which a pressure can be selected in the cabin 33. Taking the case when the cabin pressure exceeds the setting on the pressure or cabin altitude selector 5, the absolute capsule 6 contracts. This presents a gap between the valve 7 and a branch from the control channel 9A, allowing air to escape through a restrictor 8 into the cabin 33. The air pressure in channel 9A reduces, and consequently, the influence which control jet 10 has on the main power stream from nozzle 1 also reduces. However, as the control stream through channel 9 controlling jet 11 is unaffected, the difference between the pressures in jets 10 and 11 diverts the main power stream towards receiving aperture 12, into control channel 14, and hence to control jet 16 in amplifier element 19. Control jet 16 diverts the power stream from power nozzle 18 towards receiving aperture 20, and thence through control channel 21 to control jet 22 in amplifier element 24 in Section B—B.

Pressure acting through control nozzle 22 diverts the power stream from nozzle 23 towards receiving aperture 25, and into control channel 27. A small bleed orifice 76 allows air to escape from the control channel, to avoid feeding the amplifier into a closed circuit. The pressure increase in the control channel 27 acts in a chamber 28, upon a diaphragm 29 of a discharge valve actuator, to compress a spring 30. A linkage 31 attached to the diaphragm 29 opens a butterfly valve 32, allowing air to escape from cabin 33 to atmosphere, indicated at 33A. Pressure, therefore, in the cabin is reduced.

When cabin pressure falls towards the setting on the altitude selector 5, the capsule 6 expands, and seals the escape of air through the pad valve 7 from control channel 9A. The pressures in the control channels tend to equalize, so that the resultant effect of the control nozzles 10 and 11 is to cause the power stream to be divided more equally between the receiving apertures 12 and 13, and flowing through control channels 14 and 15 to control nozzles 16 and 17 in amplifier 19, divides the power stream from nozzle 18 more equally between receiving apertures 20 and 58. Similarly, the flow from the receiving apertures 20 and 58 in control channels 21 and 59 into amplifier element 24 causes the control nozzles 22 and 60 to direct the power stream from nozzle 23 to divide, venting partly through receiving aperture 26 into the cabin 33. The pressure in the chamber 28 of the valve actuator reduces, and the spring 30, acting against the reduced pressure on the diaphragm 29, causes the linkage to tend to shut the butterfly valve 32 and maintain the pressure in the cabin 33. Insufficient pressure in the cabin has a similar but greater reaction to the one just described, and results in a further movement towards closure of the butterfly valve 32.

In order to have a control upon the rate of change of cabin pressure, a rate control section CC is provided. If, for example, the aircraft climbs, the cabin pressure will tend to decrease accordingly, until the cabin pressure selected by the adjustment of the capsule altitude selector 5 is reached. The decrease in cabin pressure is passed through an intake filter into control channels 35 and 35A, through restrictors 36 and 37 to control jets 40 and 41 of an amplifier element 43. In channel 35 there is a rate of change of pressure control 39, comprising a chamber 38 with an adjustable volume. Because of the extra capacity in channel 35, due to the chamber 38, pressure changes through channel 35A reach and effect control jet 41 ahead of the change through channel 35, affecting jet nozzle 49. In the case of an aircraft climbing, the reduction of pressure in the cabin 33 causes the pressure at control jet 41 to reduce in comparison with that at jet 40, and the power flow from nozzle 42 will divert towards receiving aperture 45, and into control channel 47. The flow is amplified in element 51, where the increase in pressure at control nozzle 49 diverts the main power stream from nozzle 50 towards receiving aperture 53 and control channel 54. The rate effect is then added through control jet 56, to the effect of control jet 10 in amplifier element 2, and presents an increase to the force in opposition to control jet 11. The resultant effect is to divert the main power stream from nozzle 1 towards receiving aperture 13, which, continuing through the various stages of amplification in the system in the manner previously described, causes the discharge valve 32 to close to an extent sufficient to reduce the rate of pressure reduction to an acceptable maximum. In the case of a pressure increase, the rate effect is reversed, tending to open the valve 32 and limit the rate of increase.

In order to improve the stability of the system, a further section DD introduces a lead lag effect upon amplifier element 19. To initiate the effect, tappings from control channels 59 and 21 feed control jets 61 and 62 of an amplifier element 64 in relation to the signals from elements 2 and 19. If, for example, the main power stream in amplifier element 19 is diverted towards receiving aperture 20 and into channel 21, due to a high cabin pressure, or to a rapidly increasing cabin pressure, the pressure at control jet 62 increases in relation to that from jet 61, and the main power stream from nozzle 63 diverts towards receiving aperture 65. The flow passes through channel 67, through an accumulator 69 and a restrictor 72, which delay the flow, to a control jet 74 in amplifier element 19, where the effect is adjusted by the component values of the accumulator 69 and restrictor 72 to damp instability. Similarly, the output from aperture 58 of amplifier 19, ducted through channel 59 to control nozzle 61, produces a feedback through aperture 66, duct 68, capacitor 70 and restrictor 71, to affect amplifier 19 in the opposite phase.

Figure 2:
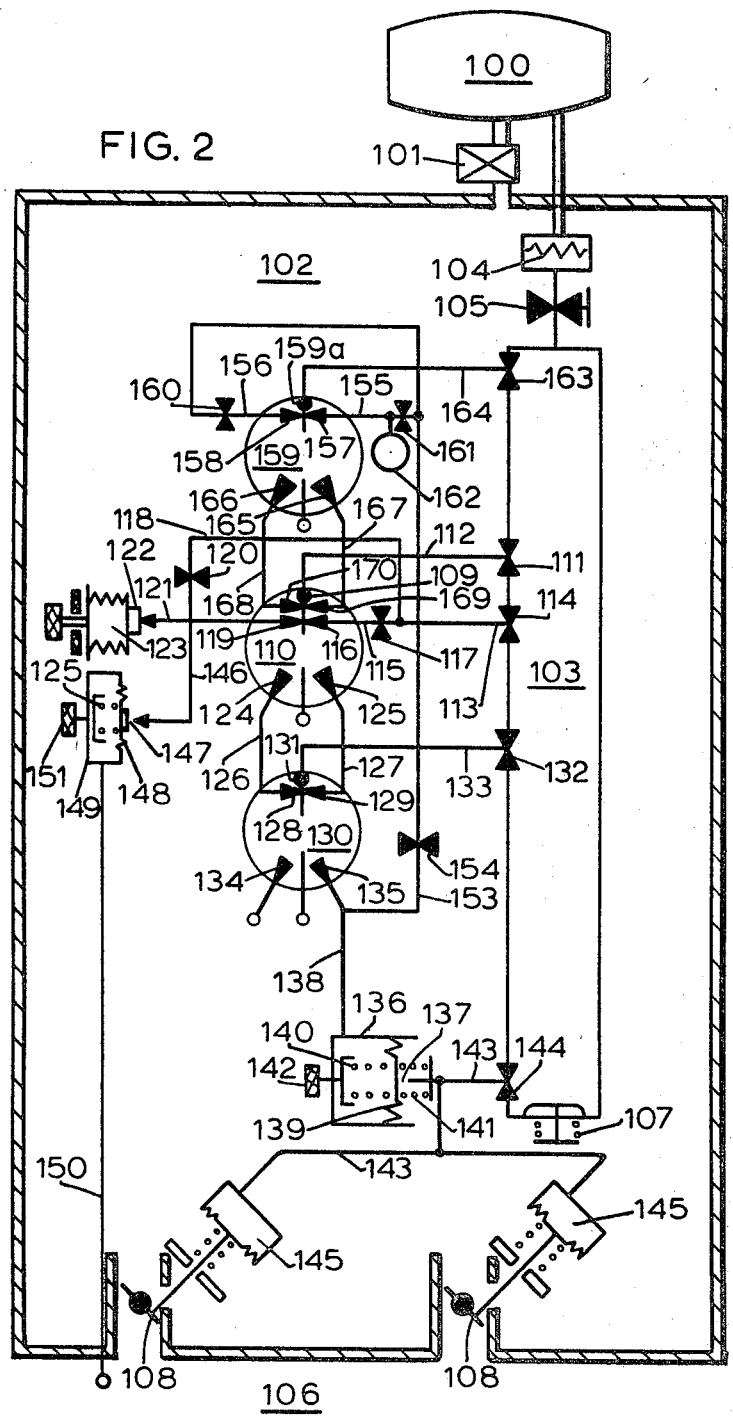
FIGURE 2 shows a modification of the invention for use in a non-passenger aircraft.

In FIGURE 2 a simplified pressure control circuit is shown, which includes an absolute system provided with a lead lag feedback for stability, and an overriding differential pressure control, but without a rate of change control.

In the system, the compressor of an aircraft engine 100, supplies air under pressure through a heat exchanger and pressure reduction system 101, to the cabin 102 of the aircraft. In addition, the compressor 100 supplies the manifold 103 of a pressure control system, through a filter 104 and a reducing valve 105. The reducing valve controls the pressure at a gauge pressure in relation to cabin rather than absolute pressure, or ambient pressure, around the cabin shown at 106. Excess pressure in the manifold is avoided by a relief valve 107. The control system operates paired discharge valves 108, which allow air to escape from the cabin 102 to ambient 106, and maintain the cabin at a selected pressure. The manifold 103 supplies the power nozzle 109 of an amplifier 110, through a restrictor 111 and duct 112. In addition, the manifold 103 supplies through a restrictor 114, a duct 113, which branches, one branch 115 feeding a control nozzle 116 of the amplifier 110 through a restrictor 117, and the other branch 118 feeding an opposing control nozzle 119, through another restrictor 120. The branch 118 has a tapping 121 to a capsule controlled pad valve 122, which allows air to escape from the duct 118 in relation to the cabin pressure, acting on the capsule 123. Variations in the cabin pressure cause variations in the pressure acting upon control nozzle 119, and vary the direction of the power stream appropriately more strongly towards one or other of the outlet apertures 124 and 125 of the amplifier 110. Alterations in the division of the power stream between outlet apertures 124 and 125 are conveyed through control channels 126 and 127 to control nozzles 128 and 129 in amplifier element 130, and react upon a main power jet from nozzle 131, which is supplied from the manifold 103, through a restrictor 132 and a duct 133. The power stream is directed by the control nozzles 128 and 129 to divide appropriately between outlet apertures 134 and 135. Outlet aperture 134 is vented to cabin, whilst aperture 135 feeds the chamber 136 of a diaphragm operated pad valve 137, through a duct 138. The diaphragm 139 is supported between opposed springs 140 and 141, to allow positive positioning by means of an adjustment screw 142. The pad valve 137 allows air to bleed from a duct 143 connecting a tapping from the manifold 103, through a restrictor 144 to diaphragm chambers 145, actuating the discharge valves 108. An increase in the diversion of the main power stream from nozzle 131 into outlet 135 tends to close the pad valve 137, reduce the bleed from the duct 143, and increase the pressure in the chambers 145, and open the discharge valves 108. A reduction in the cabin pressure upon capsule 123 operates through the system diverting the power streams towards the other outlet apertures, and results in closing the discharge valves to an appropriate degree.

In addition to varying the bleed from duct 118 to control nozzle 119 of amplifier element 110, through the pad valve 122 in relation to cabin pressure, a branch duct 146 feeds a pad valve 147 to provide a bleed for an overriding differential control. The pad valve 147 is supported by a spring loaded diaphragm 148, forming one wall of a chamber 149, which is maintained at ambient pressure by a static duct 150 to ambient 106. The loading on the diaphragm 148 is adjusted by a screw 151, acting upon the spring 152, which keeps the valve closed until the difference between the cabin pressure and ambient pressure around the cabin exceeds a maximum value. At this value the differential pressure on the diaphragm 148 opens the valve 147, and causes the pressure in duct 118 and at nozzle 119 to reduce; the main power stream from power nozzle 109 then diverts towards outlet aperture 124. The resulting increased pressure in control nozzle 128 tends to divert the main power stream from nozzle 131 towards outlet aperture 135 in amplifier element 130, and causes a pressure increase in chamber 136, which closes pad valve 137. The pressure increases in the actuator chambers 145, opens the discharge valves to an extent to maintain the cabin differential pressure at the acceptable maximum.

The output from the amplifiers in duct 138 is tapped through a feed back duct 153, to apply a stabilising or damping effect through an amplifier element 159. An adjustment restrictor 154 controls the authority of the feed back upon the system. The duct 153 branches to feed two control ducts 155 and 156, each including a balancing restrictor 160 and 161, and feeding opposed control nozzles 157 and 158 of the amplifier element 159. One of the ducts 155 includes a accumulator 162, which causes a phase difference between the control nozzles 157 and 158, and produce a diversion of the main power stream of the amplifier from nozzle 159a differently phased from the initiating pressure change in duct 138. The extent of the phase change depends upon the component values of the restrictors and capacitors in the circuit, and whether the capacitor 162 is positioned in duct 155 or duct 156. The main power stream is fed from the manifold 103, through restrictor 163 and duct 164, and is diverted by the action of the control nozzles 157 and 158 towards the appropriate receiving aperture 165 or 166. The output feeds through ducts 167 and 168 to supplementary opposed control nozzles 169 and 170 in amplifier 110, where the feed back lead lag effect is summed with the control effect from nozzles 116 and 119.

It will be obvious to those skilled in the art that certain modifications can be applied without departing from the scope of the invention, for example, the fluid passing through all or part of the system can be a gas or a liquid, depending upon the equipment requiring pressurisation. Additional stages of amplification can be interconnected as required, or additional lead lag can be included for stability. Additional accumulators and restrictors can be added as required, and restrictors can be adjustable, such as needle valve restrictors, or fixed, such as orifice or capilliary. Servo systems can be included, when fluid pressures are insufficient to develop the necessary power.

Figure 3:
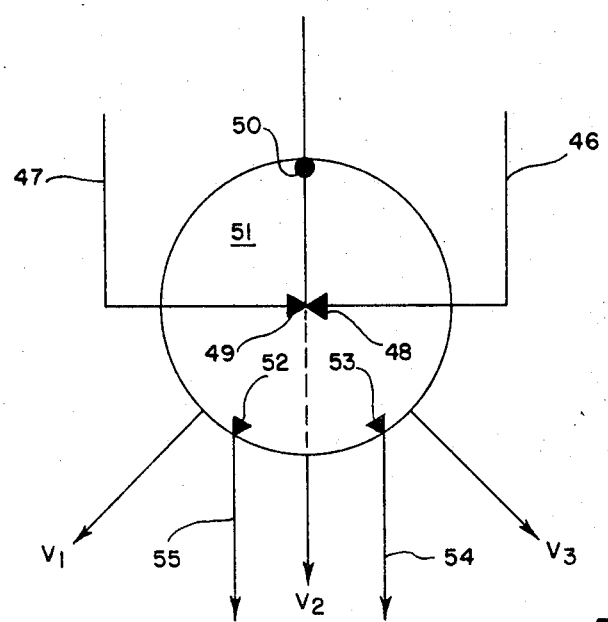
FIGURES 3 and 4 are diagrammatic representations of certain types of fluid amplifiers.
Figure 4:
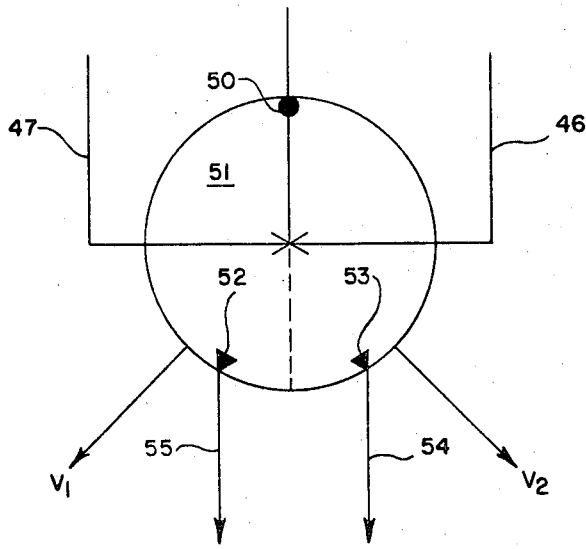

Although only one type of amplifier element is shown, this could be varied, and several types can be used together or individually. Vented amplifiers may be used to simplify the design, so that all the fluid used in an amplifier element need not be accommodated by subsequent elements, but can be vented to space. Suitable vented amplifiers are shown in FIGURES 3 and 4. In FIGURE 3, a vented jet interaction beam deflection type is shown. For convenience, the amplifier is shown as amplifier 51 of FIGURE 1 and like numerals have like parts. The amplifier is vented at $V_1$, $V_2$ and $V_3$ as shown and is otherwise like amplifier 51 and operates in the same manner. A vented pressure interaction beam deflection type is shown in FIGURE 4. In this device, the power stream through nozzle 50 is deflected by variations in pressures in control conduits 46, 47 which, in this instance, are not provided with jets, to vary the flow of power fluid through apertures 52 and 53 which, in turn, varies the pressure in conduits 55 and 54. The device is vented at $V_1$ and $V_2$ and functions similarly as the jet interaction amplifier previously mentioned.

The control method can be applied in any static or mobile enclosure or compartment, such as an aircraft cabin, hyperbaric chamber, space craft or submarine installation, and transducers may be used to convert pressure or flow into electrical signals, or vice versa, where required for particular actuators, amplifiers, sensors or transmission systems.

The control system can also be converted to adjust a valve admitting fluid from a pressure source into an enclosed chamber which has fluid discharge means, such as a relief valve, natural leakage or controlled apertures. Alternatively, both inflow and outflow can be controlled to provide a balanced flow through an enclosed chamber.

I claim as my invention:

1. A fluid operated pressure control system comprising: a chamber; pressure increasing means to increase chamber pressure; pressure decreasing means to decrease chamber pressure; a fluid amplifier including a power nozzle for a flow of power fluid, a plurality of outlet apertures for said power fluid, and at least one control nozzle for a flow of control fluid which interacts with said flow of power fluid from said power nozzle to control the direction of said flow of power fluid with respect to said apertures; means responsive to chamber pressure to vary the flow of control fluid to a control nozzle of said fluid amplifier to control the flow of power fluid to said apertures; means responsive to flow of power fluid from said apertures to actuate at least one of said pressure increasing means and said pressure decreasing means to adjust chamber pressure towards a predetermined value.

2. A fluid operated pressure control system comprising: a chamber; means to pressurize said chamber; valve means to vent said chamber; a fluid amplifier including a power nozzle for a flow of power fluid, a plurality of outlet apertures for said power fluid, and at least one control nozzle for a flow of control fluid which interacts with said flow of power fluid from said power nozzle to control the direction of said flow of power fluid with respect to said apertures; means responsive to chamber pressure to vary the flow of control fluid to a control nozzle of said fluid amplifier to control the flow of power fluid to said apertures; means responsive to flow of power fluid from said apertures to at least partially close said valve means in the event of chamber underpressure and to at least partially open said valve means in the event of chamber overpressure, whereby the chamber pressure is adjusted towards a predetermined value.

3. A fluid operated pressure control system according to claim 2 wherein said chamber comprises an aircraft cabin.

4. A fluid operated pressure control system according to claim 2 wherein said chamber comprises a hyperbaric chamber.

5. A fluid operated pressure control system according to claim 2 wherein said power fluid and said control fluid comprise air.

6. A fluid operated pressure control system according to claim 2 wherein said fluid amplifier is a beam deflection pressure interaction vented amplifier.

7. A fluid operated pressure control system according to claim 2 wherein said fluid amplifier is a beam deflection jet interaction vented amplifier.

8. A fluid operated pressure control system according to claim 2 wherein said means responsive to chamber pressure comprises control valve means and a sealed capsule located within said chamber, said capsule being responsive to chamber pressure to actuate said control valve means.

9. A fluid operated pressure control system according to claim 8 wherein said capsule is adjustably positionable to actuate said control valve means at said pre-determined pressure.

10. A fluid operated pressurisation control system, as claimed in claim 2, in which at least a part of an output from a fluid amplifier feeds a duct network, including at least one accumulator and one restrictor, to produce an output from the network, which, applied to at least one control nozzle of a fluid amplifier, assists in stabilising the control system.

11. A fluid operated pressurisation control system, as claimed in claim 10, in which said part of an output from a fluid amplifier is divided, one division feeding a first control nozzle of a fluid amplifier by way of a duct system having a greater time constant than that of another division feeding a second control nozzle of a fluid amplifier, and opposed in effect on the output of the amplifier network to that of said first control nozzle.

12. A fluid operated pressurisation control system, as claimed in claim 2, including a pair of control nozzles of opposite effect upon the system, being both fed from fluid in the chamber, one of the control nozzles of the pair being fed through a duct system having a greater time delay than the duct system feeding the other control nozzle of the pair, said pair of control nozzles producing an effect upon the control system related to the rate of change of pressure within said chamber, said rate of change effect being employed to reduce said rate of change of pressure.

13. A fluid operated pressurisation control system, as claimed in claim 2, including a differential capsule acted upon differentially by the pressure within the chamber, and the ambient pressure around the chamber, said differential capsule controlling means which vary the pressure at a control nozzle of a fluid amplifier, and divert the power flow in the fluid amplifier, to actuate means which maintain the differential pressure within a predetermined maximum value.

14. A fluid operated pressurisation control system, as claimed in claim 13, in which the differential capsule is situated in the chamber, and the interior of the capsule is maintained at a pressure related to the ambient pressure around the chamber, and the diverison of the power flow in response to the differential capsule actuates the discharge valve to open and reduce the differential pressure to the predetermined maximum value.

15. A fluid operated pressurisation control system, as claimed in claim 13, in which said differential capsule is adjustably positioned in order to vary the predetermined maximum value within which the differential pressure is controlled.

References Cited

UNITED STATES PATENTS

| | | | |
|---|---|---|---|
| 1,959,889 | 5/1934 | Wunsch | 137—81.5 |
| 2,450,076 | 9/1948 | Bechberger | 98—1.5 |
| 2,665,624 | 1/1954 | Arthur | 98—1.5 |
| 2,669,175 | 2/1954 | Fischer | 98—1.5 |
| 3,137,309 | 6/1964 | Blaze | 137—81.5 |

MEYER PERLIN, *Primary Examiner.*

U.S. Cl. X.R.

137—81.5